(12) United States Patent
Schäfer et al.

(10) Patent No.: US 7,931,805 B2
(45) Date of Patent: Apr. 26, 2011

(54) MEMBRANE FILTER UNIT AND METHOD FOR THE PRODUCTION OF THE MEMBRANE FILTER UNIT

(75) Inventors: Stefan Schäfer, Aachen (DE); Klaus Vossenkaul, Aachen (DE); Christoph Kullmann, Eschweiler (DE); Andreas Kruse, Herzogenrath (DE)

(73) Assignee: Koch Membrane Systems GmbH, Aachen (DE)

( * ) Notice: Subject to any disclaimer, the term of this patent is extended or adjusted under 35 U.S.C. 154(b) by 102 days.

(21) Appl. No.: 12/381,097

(22) Filed: Mar. 6, 2009

(65) Prior Publication Data
US 2009/0200695 A1 Aug. 13, 2009

Related U.S. Application Data

(62) Division of application No. 10/587,307, filed as application No. PCT/EP2005/000720 on Jan. 26, 2005, now abandoned.

(30) Foreign Application Priority Data

Jan. 27, 2004 (DE) .................. 10 2004 004 212

(51) Int. Cl.
*B01D 63/02* (2006.01)
*B01D 61/00* (2006.01)

(52) U.S. Cl. ........... 210/321.78; 210/321.79; 210/321.8; 210/321.81; 210/321.87; 210/321.88; 210/321.89; 210/321.9; 264/258; 264/DIG. 48; 156/145; 156/242; 156/245

(58) Field of Classification Search .............. None
See application file for complete search history.

(56) References Cited

U.S. PATENT DOCUMENTS

| | | | |
|---|---|---|---|
| 3,708,071 A | 1/1973 | Crowley | |
| 4,902,419 A | 2/1990 | Shibata et al. | |
| 5,639,373 A * | 6/1997 | Mahendran et al. | 210/636 |
| 5,840,230 A | 11/1998 | Geleff et al. | |
| 6,180,038 B1 | 1/2001 | Cesaroni | |
| 6,294,039 B1 | 9/2001 | Mahendran et al. | |
| 2001/0037967 A1 * | 11/2001 | Rabie et al. | 210/321.8 |

(Continued)

FOREIGN PATENT DOCUMENTS

DE 39 31 981 9/1990

(Continued)

OTHER PUBLICATIONS

International Search Report, 2005.

*Primary Examiner* — Krishnan S Menon
(74) *Attorney, Agent, or Firm* — Collard & Roe, P.C.

(57) ABSTRACT

The invention relates to a membrane filter unit for liquid or gaseous media, comprising a bundle of capillary membranes which are open on at least one front surface side and which are cast in an area which is close to the end of the open membrane ends, in a sealing layer forming a hardened head part. The open membrane ends protrude on the outer side of the sealing layer. The sealing layer is arranged on a spacer element which has a layer which is penetrated by the capillary membranes and which is non-permeable in relation to the casting material which hardens in order to form the sealing layer. The invention also relates to a method for the production of a membrane filter unit.

5 Claims, 6 Drawing Sheets

Figure 1:
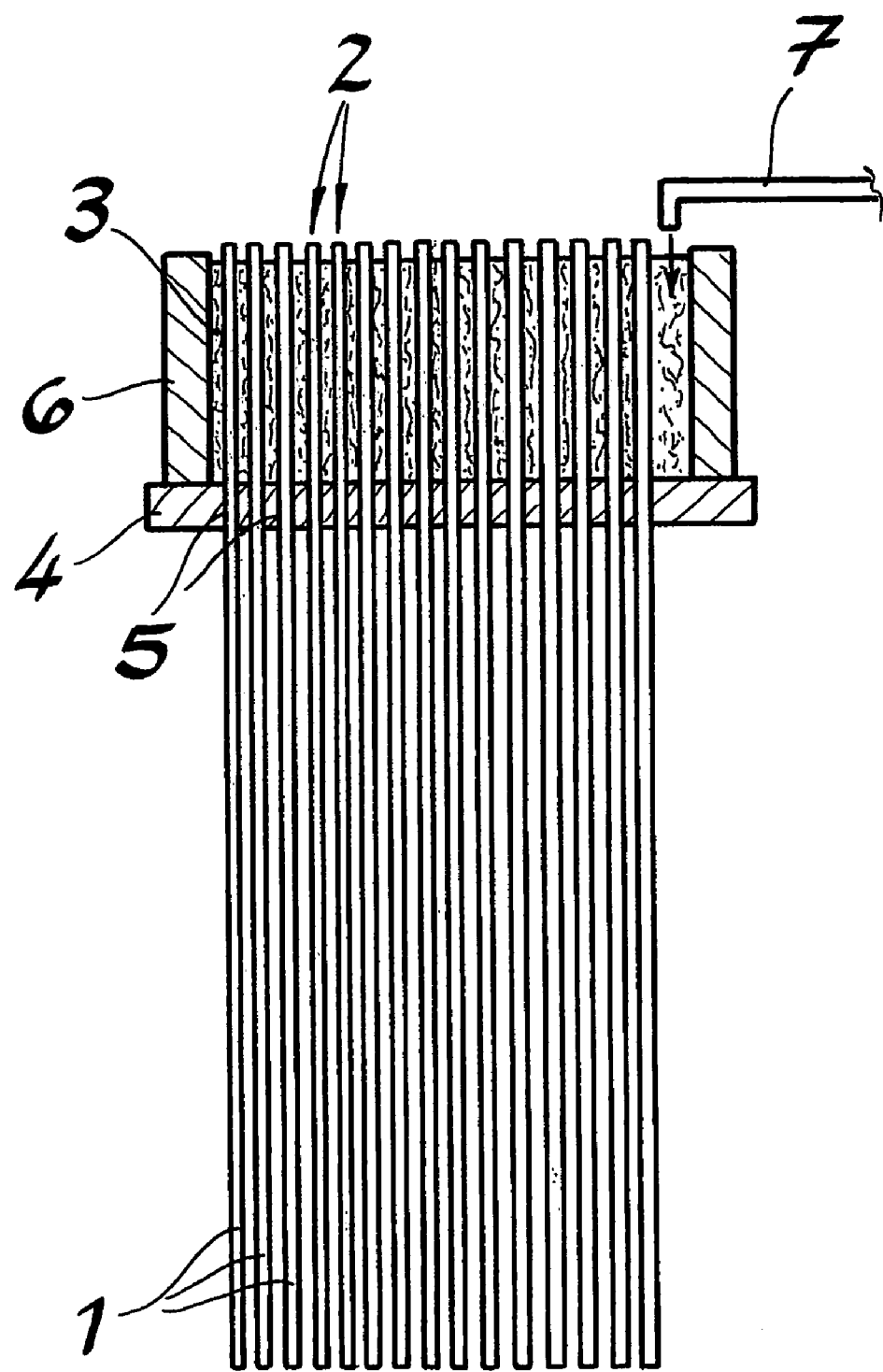

| U.S. PATENT DOCUMENTS | | | |
|---|---|---|---|
| 2004/0076874 A1 | 4/2004 | Nickel et al. | |

FOREIGN PATENT DOCUMENTS

| EP | 0 170 210 | 2/1986 |
|---|---|---|
| EP | 0 338 774 | 10/1989 |
| EP | 0 771 233 | 5/1997 |
| EP | 1 374 979 | 1/2004 |
| JP | 05-228345 | 9/1993 |
| WO | WO 00/44483 | 8/2000 |
| WO | WO 01/85315 | 11/2001 |

* cited by examiner

MEMBRANE FILTER UNIT AND METHOD FOR THE PRODUCTION OF THE MEMBRANE FILTER UNIT

This application is a divisional of and Applicants claim priority under 35 U.S.C. §§120 and 121 of parent U.S. patent application Ser. No. 10/587,307 filed Aug. 29, 2006, now abandoned. Applicants claim priority under 35 U.S.C. §119 of German Application No. 10 2004 004 212.8 filed Jan. 27, 2004. Applicants also claim priority under 35 U.S.C. §365 of PCT/EP2005/000720 filed Jan. 26, 2005. The international application under PCT article 21(2) was not published in English.

The invention relates to a membrane filter unit for liquid or gaseous media, with a bundle, or a plurality disposed in any desired manner, of capillary membranes open on at least one face, which are cast into a sealing layer that has hardened to form a solid head piece, in a region close to the end, with regard to the open membrane end, whereby the open membrane ends protrude on the outside of the sealing layer.

The capillary membranes used for membrane filtration can have outside diameters between 200 pm and about 5 mm, depending on the configuration and case of use. In order to assure proper function during membrane filtration, the capillary membranes must be cast into the head piece without defects. Furthermore, it must be assured that the capillary membranes are not glued shut, plugged up, or mechanically damaged at their ends, during production of the head piece, which is produced as a cast part. Mechanical processing by means of cutting should be avoided, since many membrane materials fray during mechanical processing.

In the case of a method for the production of a membrane filter unit having the characteristics described initially, which is known from U.S. Pat. No. 5,639,373, the end of the membrane bundle is dipped into a liquid layer that solidifies to form a solid carrier. Subsequently, the sealing layer, which consists of plastic mass, is applied to this carrier layer, and the capillary membranes are cast into the plastic mass. After the plastic mass has hardened, the carrier layer is liquefied again and removed, whereby the ends of the capillary membranes are exposed. Problems in terms of production technology occur if the capillary membranes are packed tightly, as the result of capillary forces that act between the capillary membranes. When the membrane bundle is dipped into the liquid, the liquid climbs upward on the outside of the capillary membranes, as determined by the capillary forces that are in effect. During subsequent product-ion of the head piece, penetration of the plastic mass from the outside into the interior of the membrane fiber bundle is prevented, and reliable enclosure of the individual membrane fibers with plastic mass is no longer guaranteed.

In the case of a method known from U.S. Pat. No. 6,294,039, the membranes to be cast into the head piece are inserted into a layer of fine-particle solids, onto which the plastic mass that hardens to form a head piece is applied. After the head piece has hardened, the solid layer is removed again, whereby the ends of the capillary membranes are exposed. The method is disadvantageous in terms of production technology, in that only a relatively small number of capillary membranes can be dipped into the solid layer at the same time, since the material allows only a slight displacement.

A method using a volatile liquid, a suspension, or a gel, into which the ends of the capillary membranes are dipped, is known from WO 01/85315. The capillary membranes are subsequently cast into a sealing mass. The substance into which the ends of the capillary membranes have been dipped has a relatively high viscosity, in order to avoid significant creep of the substance as the result of capillary forces. However, in this method, as well, it cannot be prevented that the substance also climbs slightly upward on the outside of the capillary membranes. For this reason, there are production technology problems here, too.

All of the known production methods have in common that in a first process step, the open ends of the capillary membranes are first dipped into a layer that prevents contact of the ends with the casting material during casting in of the capillary membranes. After the head piece has hardened, the ends of the capillary membranes must be exposed again by means of removal of this layer. The known production methods therefore require a relatively great amount of effort.

In EP 0 771 233 B1, a method for the production of head pieces of a membrane filter unit is described, in which capillary membranes are guided through a bottom of a casting mold configured as a perforated plate. A viscous casting material is placed into the casting mold, which fills the free space between the capillary membranes and hardens to form a solid head piece. The head piece is subsequently pulled out of the casting mold, with the capillary membranes. In a last method step, the head piece is cut through in order to open the capillary membranes. After the head piece has been cut open, the open ends of the capillary membranes end in a plane with the outer surface of the hardened sealing layer. The method is not suitable for capillary membranes that fray during mechanical processing.

Proceeding from the problems described, the invention is based on the task of indicating a membrane filter unit having the characteristics described initially, the head piece of which can be produced in simple manner, free of defects, without mechanical processing.

This task is accomplished according to the invention in that the sealing layer is disposed on a spacer that has a layer that is penetrated by the capillary membranes and is impermeable for the casting material that hardens to form the sealing layer. In the production of the membrane filter unit, it is practical if a wall that encloses the totality or individual groups of the capillary membranes to be processed is set onto the side of the spacer that faces the open ends of the capillary membranes, which wall forms the casting mold for the sealing layer, together with the spacer that forms a bottom. It also lies within the scope of the invention that a collar is formed onto the spacer, which forms an accommodation space for the casting material and can be used as a casting mold. In particular, the wall can also be an integral component of a head piece, which has a permeate collection space, which is in fluid communication with the open membrane ends that protrude out of the casting material. Production of the head piece takes place by means of filling the casting mold, whereby the layer of the spacer that is impermeable for the casting material prevents flow of the casting material out of the casting mold. In this connection, the height of the casting layer is dimensioned in such a manner that the open ends of the capillary membranes remain unclosed. In this manner, defect-free head pieces can be produced without problems. In the case of the membrane filter unit according to the invention, structured arrangements of the capillary membranes, such as star-shaped, ring-shaped, or rectangular geometries, can be implemented without problems. Such arrangements allow cleaning of the capillary membranes during operation, for example, by means of central air application. By means of the spacer, it is possible to ensure a defined distance between the individual capillary membranes. In this way, it is guaranteed that each individual capillary membrane is enclosed by casting material, without defects. The spacer can furthermore be provided with feed lines, for example for air application.

The spacer can consist of a perforated plate whose openings enclose the capillary membranes essentially without a gap. In this case, the capillary membranes are pushed through the openings in the perforated plate. Subsequently, the casting material is applied to the top of the spacer. The perforated plate can consist of metal or plastic or an elastomer material, for example.

It also lies within the scope of the invention that the spacer consists of a flexible plastic strip that has openings or lateral slots for accommodation of the capillary membranes. The plastic strip can be wound up in spiral shape, or segments of the plastic strip can be combined to form a multi-layer package.

Another embodiment of the invention provides that the spacer has a functional layer of fine-particle solid and/or a soft substance and/or a film, which is punctured by the ends of the capillary membranes before the casting process. In the case of larger capillary diameters, for example, it can be practical in this connection to first close the open membrane ends with a substance that can easily be removed again after puncturing. The functional layer can be disposed in a carrier provided with openings.

Figure 2:
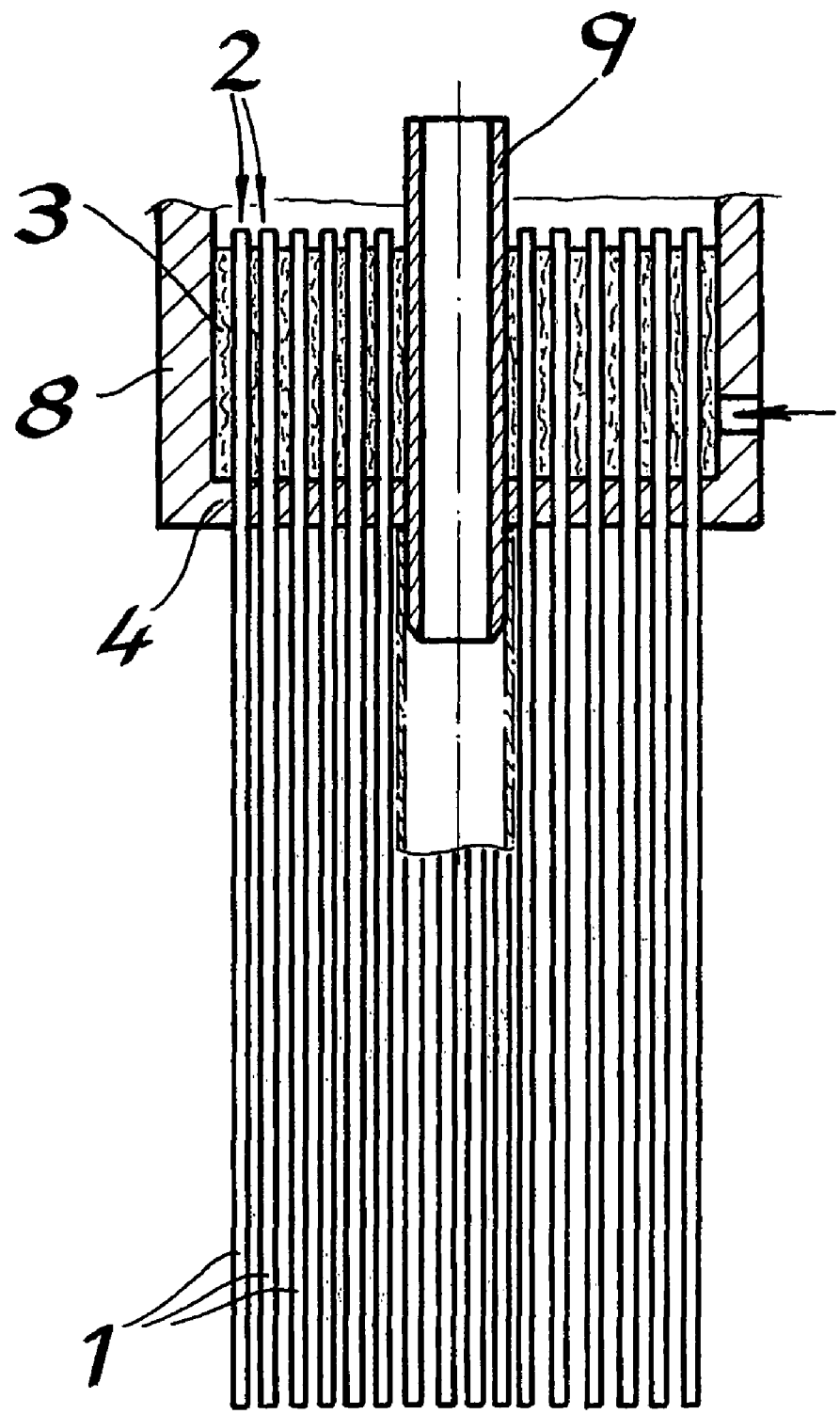
Figure 3:
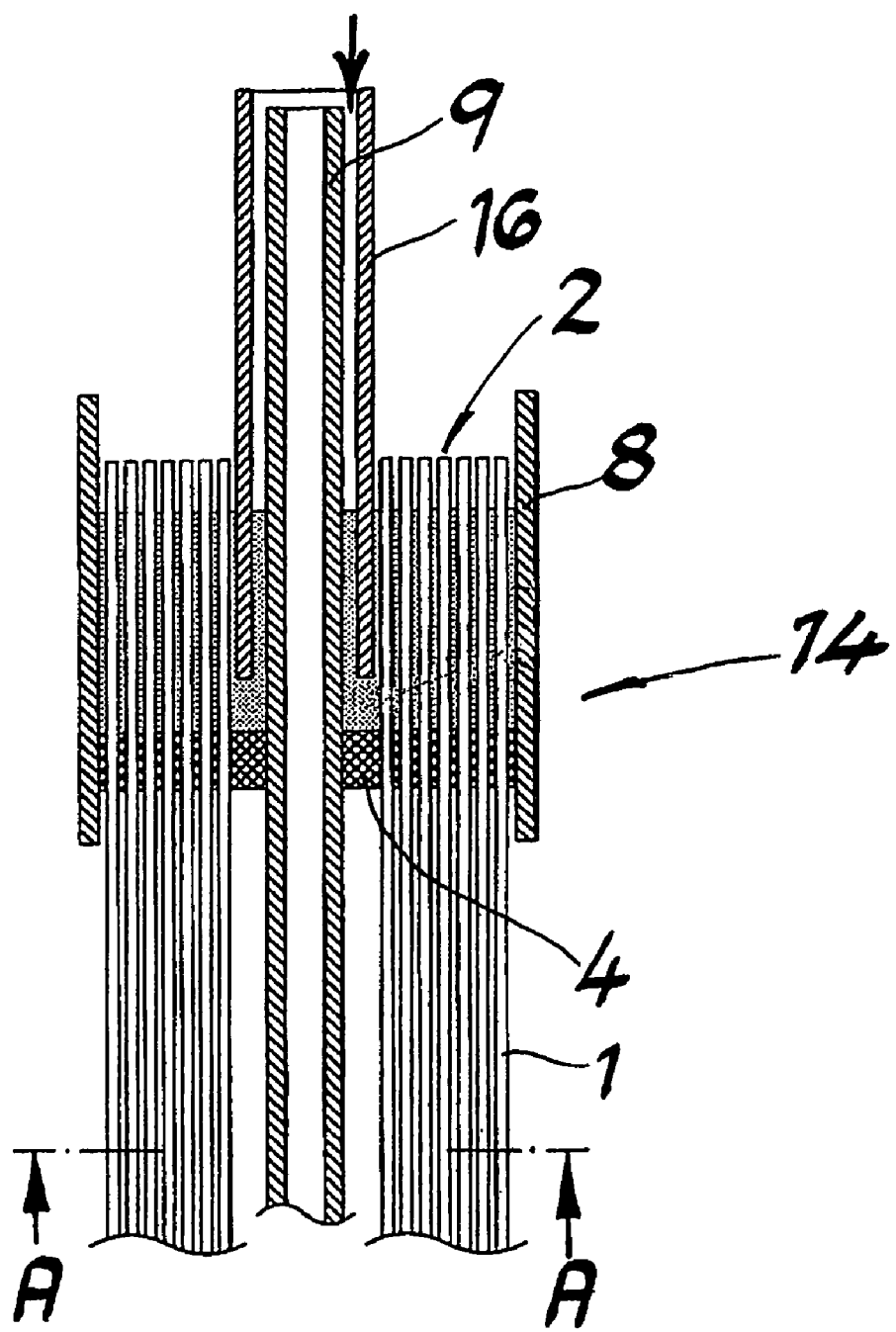
Figure 4:
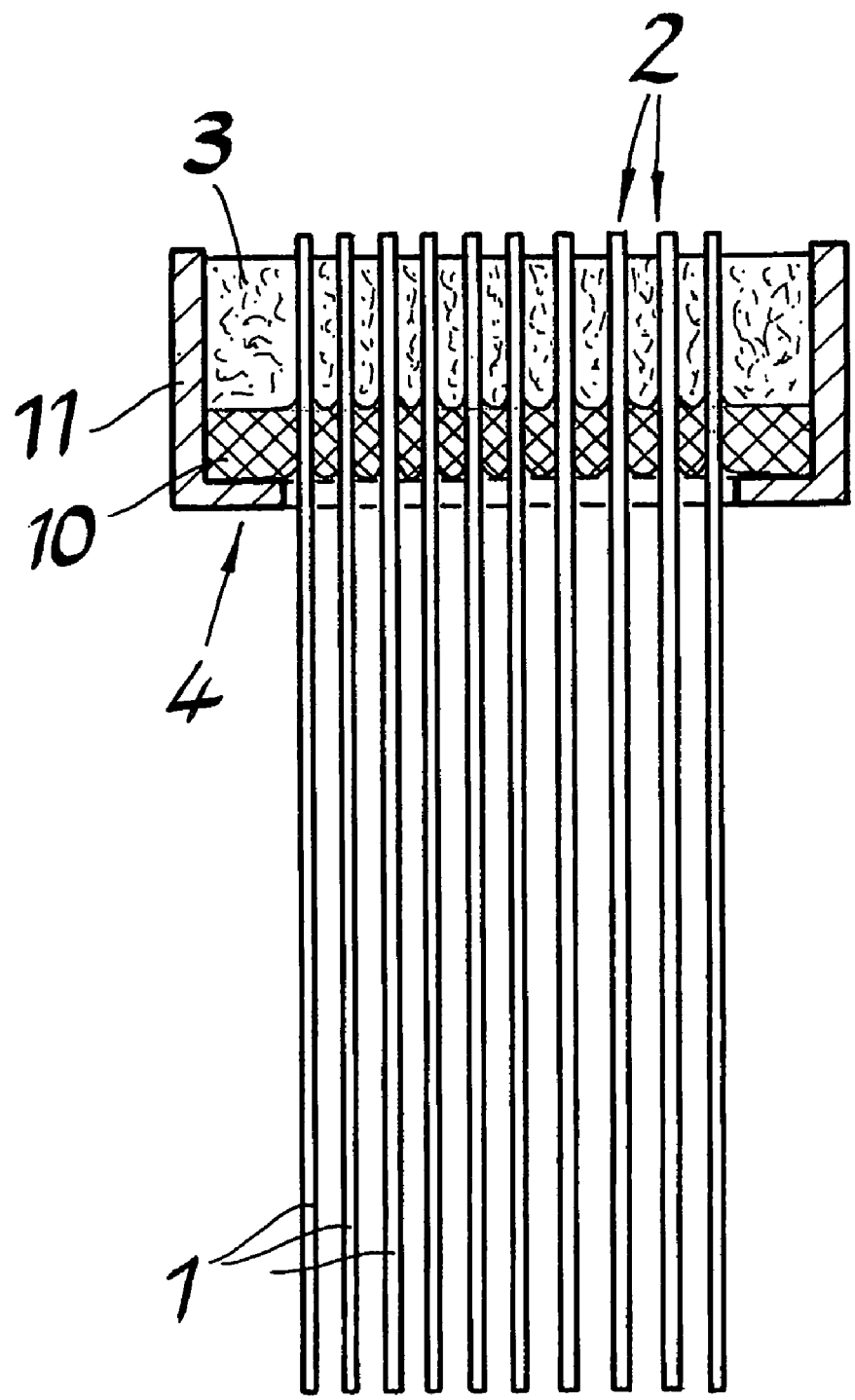
Figure 5:
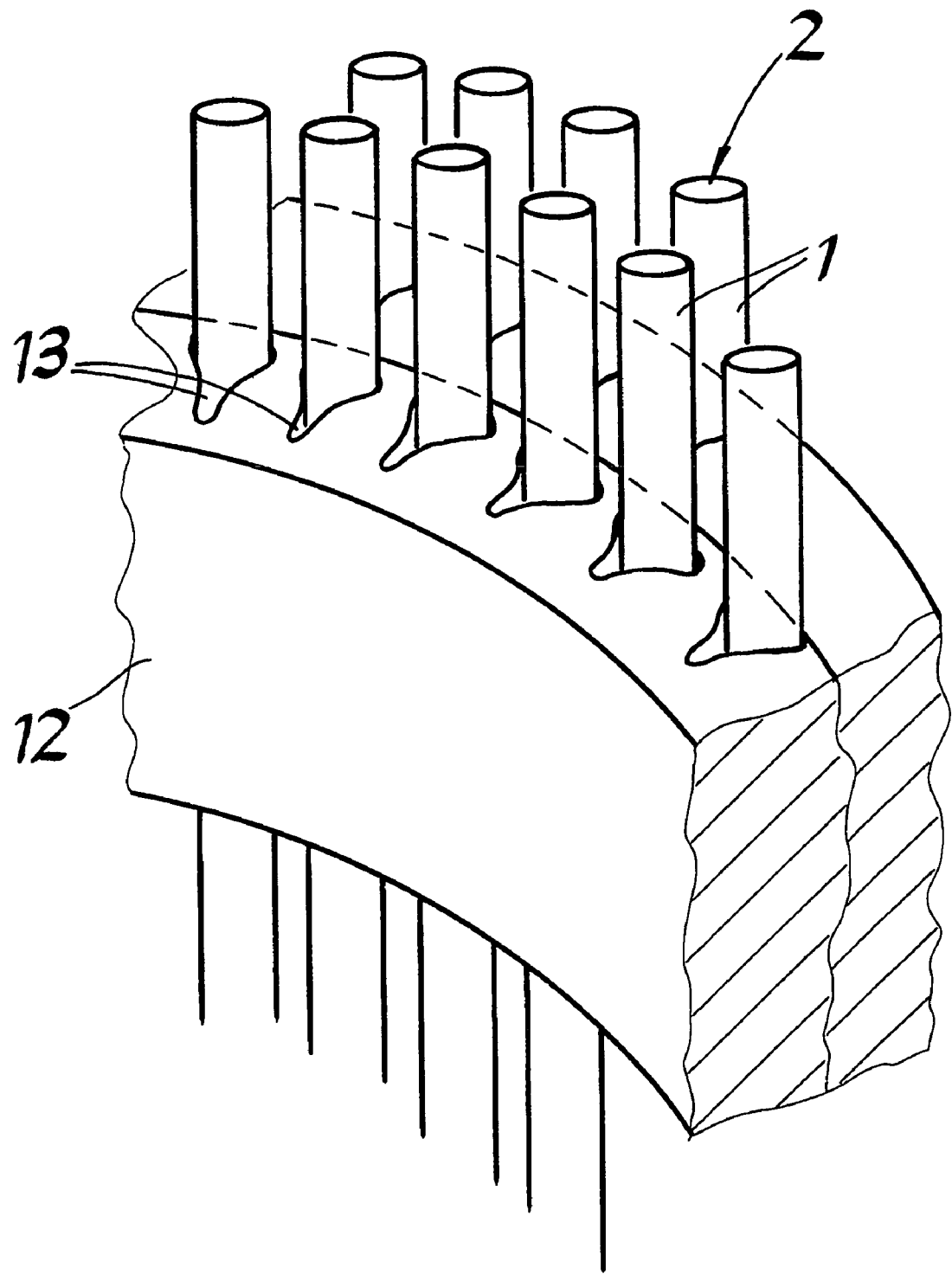
Figure 6:
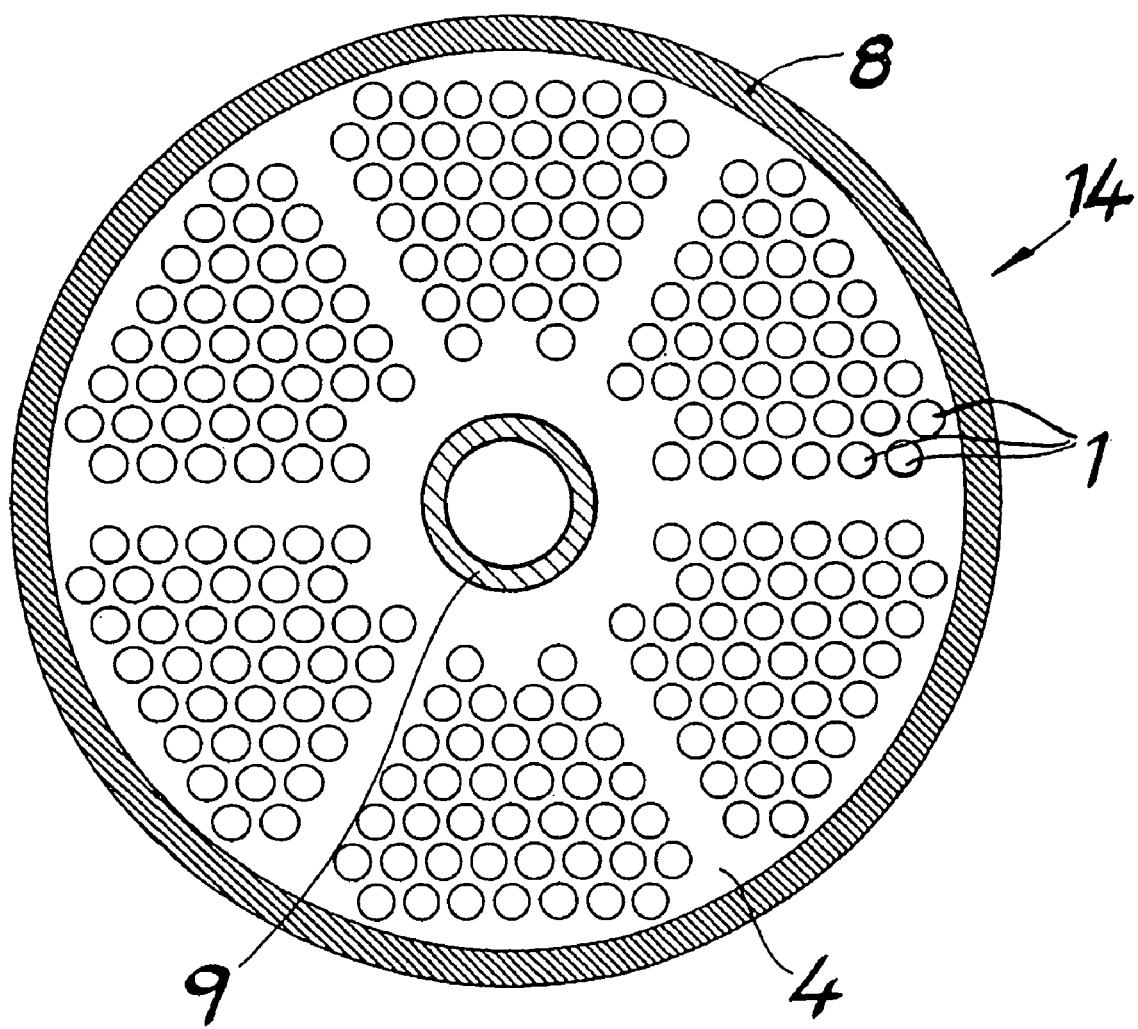

The object of the invention is also a method for the production of the membrane filter unit described. In this method, capillary membranes are inserted into a spacer with one protruding end, which spacer has a layer that is penetrated by the capillary membranes and is impermeable for casting material. A sealing layer of viscous casting material is then applied to the spacer, which material fills the free space between the capillary membranes that protrude at the top of the spacer, up to a level below the membrane ends, and hardens to form a solid head piece. Preferred embodiments of this method are described in claims 8 to 16 and are explained in the following, using exemplary embodiments. The drawing schematically shows:

FIG. 1 a membrane filter unit according to the invention during the production process, FIG. 2 to 5 further embodiments of the teaching according to the invention, FIG. 6 the section A-A from FIG. 3.

The figures show a membrane filter unit for liquid or gaseous media with a bundle, or a plurality disposed in any desired manner, of capillary membranes 1 open on at least one face, which are cast into a sealing layer 3 that has hardened to form a solid head piece, in a region close to the end, with regard to the open membrane end 2. It is evident from the drawings that the open membrane ends 2 protrude at the top of the sealing layer 3, in other words on the outside of the head piece. The sealing layer 3 is applied, on its side that faces away from the open ends 2 of the capillary membranes 1, to the side of a spacer 4 that points upward. The spacer 4 has a layer that is penetrated by the capillary membranes 1 and is impermeable, or at least impermeable to a great extent, for the casting material that has cured to form the sealing layer 3. In the exemplary embodiment of FIG. 1, the spacer 4 consists of a perforated plate, the openings 5 of which enclose the capillary membranes essentially without a gap. Depending on the embodiment, the openings or part of the openings of the perforated plate can be widened or stretched. Charging of the perforated plate with the capillary membranes can take place by means of pushing or pulling them in.

In the production of the membrane filter unit, the capillary membranes 1 are inserted into the perforated plate 4 with a protruding end, in that the capillary membranes 1 penetrate the perforated plate 4. Afterwards, a wall 6 is set onto the perforated plate 4, on the top, which wall forms a casting mold for the sealing layer 3, together with the perforated plate 4, which forms a bottom. The sealing layer 3, which consists of viscous casting material, is subsequently applied to the perforated plate 4. The casting material fills the free space between the ends of the capillary membranes 1 that protrude at the top of the perforated plate 4, and hardens to form a solid head piece. It is furthermore evident from the figures that each opening 5 of the perforated plate 4 has a capillary membrane 1 assigned to it. This guarantees defect-free enclosure of each individual capillary membrane 1 by the casting material. Furthermore, structured arrangements of the capillary membranes 1 can be implemented in this manner, without problems. The ends 2 of the capillary membranes 1 that protrude above the perforated plate 4 remain unclosed during application of the casting material. In the exemplary embodiment of FIG. 1, the casting material is passed to the top of the spacer 4 by means of a feed channel 7, next to the capillary membranes 1. It lies within the scope of the invention that the sealing layer 3 is applied to the perforated plate 4 in one or more layers. In the case of multi-layer application of the sealing layer, the lower layer, in each instance, has hardened at least partially before the next layer is applied. The multi-layer structure can have an advantageous effect on the physical properties of the sealing layer 3. Thermoplastic or duroplastic plastics, for example polyurethane resins or epoxy resins, can be used as the casting material. After the casting material has hardened, the wall 6 can be removed, if necessary.

In the exemplary embodiment of FIG. 2, a collar 8 is molded onto the spacer 4, which collar forms an accommodation space for the casting material. The spacer 4, which is configured with a collar 8, forms a lost casting mold 14. In the exemplary embodiment, this mold has one or more openings 15, through which the casting material is supplied. In the exemplary embodiment, the component that forms the casting mold 14 is additionally supplied with a pipe socket 9 that can be used for applying gas to the membrane filter unit. Another preferred possibility for supplying the casting material is shown in FIG. 3. In this connection, the casting material is fed through a pipe 16 that encloses the pipe socket 9 of the component 14 with a ring gap.

In the exemplary embodiment of FIG. 4, the spacer 4 has a functional layer 10 of a soft substance, which has been punctured by the ends of the capillary membranes 1. The functional layer 10 is disposed on a carrier provided with openings. Instead of a soft substance, a fine-particle solid or a film can also be used.

In the exemplary embodiment of FIG. 5, the spacer 4 consists of a flexible plastic strip 12, which has openings or lateral slots 13 for accommodating the capillary membranes 1. The capillary membranes 1 are inserted into the lateral slots 13 or openings of the plastic strip 12, which strip is wound up into a spiral. Instead of the spiral-shaped arrangement shown in FIG. 5, segments of the plastic strip 12 can also be combined into a multi-layer package.

In the case of the membrane filter unit according to the invention, structured arrangements of the capillary membranes, for example star-shaped, ring-shaped, or rectangular geometries, can be implemented without problems. In the case of the arrangement shown in FIG. 6, the capillary membranes 1 are bundled in arcs. A free space remains between the arcs, which allows flow on the untreated water side, all the way into the interior of the membrane fiber bundle.

What is claimed is:

1. Method for the production of a membrane filter unit for liquid or gaseous media, the membrane filter unit having a plurality of capillary membranes open on at least one face, which are cast into a sealing layer that has hardened to form a solid head piece, in a region close to the end, with regard to the open membrane end, whereby the open membrane ends protrude on the outside of the sealing layer, wherein the sealing layer is disposed on a spacer that has a layer that is penetrated by the capillary membranes and is impermeable for the casting material that hardens to form the sealing layer, whereby capillary membranes are inserted into the spacer with one protruding end, which spacer has a layer that is penetrated by the capillary membranes and is impermeable for casting material, whereby a sealing layer of viscous casting material is applied to the spacer, which material fills the free space between the capillary membranes that protrude at the top of the spacer, up to a level below the membrane ends, and hardens to form a solid head piece, whereby the spacer comprises a perforated plate in which the openings of the perforations are stretchable to insert the capillary membranes therethrough, and whereby a capillary membrane is inserted through each of the perforation openings.

2. Method according to claim 1, wherein the ends of the capillary membranes that protrude above the spacer remain unclosed during application of the casting material.

3. Method according to claim 1, wherein the casting material is fed in at the top of the spacer, next to the capillary membranes.

4. Method according to claim 1, wherein the casting material is fed in through one or more openings of a component that accommodates the casting material.

5. Method according to claim 1, wherein the sealing layer is applied to the spacer in several layers, whereby the lower layer, in each instance, has hardened at least partially before the next layer is applied.

* * * * *